United States Patent
Chen et al.

(10) Patent No.: US 9,619,437 B2
(45) Date of Patent: *Apr. 11, 2017

(54) SYSTEM AND METHOD OF PROVIDING A CONTEXT-AWARE PERSONALIZED BLOGGING AGENT

(71) Applicant: AT&T Intellectual Property II, L.P., Atlanta, GA (US)

(72) Inventors: Yih-Farn Robin Chen, Bridgewater, NJ (US); Rittwik Jana, Parsippany, NJ (US); Serban Jora, Roanoke, NJ (US); Bernard S. Renger, New Providence, NJ (US); Bin Wei, Basking Ridge, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 568 days.

This patent is subject to a terminal disclaimer.

(21) Appl. No.: 13/690,837

(22) Filed: Nov. 30, 2012

(65) Prior Publication Data

US 2013/0091410 A1  Apr. 11, 2013

Related U.S. Application Data

(63) Continuation of application No. 11/459,321, filed on Jul. 21, 2006, now Pat. No. 8,370,451.

(51) Int. Cl.
*G06F 15/16* (2006.01)
*G06F 17/21* (2006.01)
(Continued)

(52) U.S. Cl.
CPC ........ *G06F 17/212* (2013.01); *G06F 17/3089* (2013.01); *G06Q 10/10* (2013.01);
(Continued)

(58) Field of Classification Search
CPC .......................... G06F 17/212; G06F 17/3089
(Continued)

(56) References Cited

U.S. PATENT DOCUMENTS 7,581,166 B2   8/2009  Renger et al.
7,639,943 B1 * 12/2009  Kalajan ................ G03B 29/00
                                                  396/429
(Continued)

OTHER PUBLICATIONS

Author: ADC Software; Title: NewzCrawler; Date: Jul. 1, 2005; webpages: http://web.archive.org/web/20050206030625/http://www.newzcrawler.com/news.shtml; http://web.archive.org/web/20050205215445/http://www.newzcrawler.com/downloads.shtml; http://web.archive.org/web/20050205222044/http://www.newzcrawler.com/features.shtml; http://web.archive.org/web/20050204131217/http://www.newzcrawler.com/screenshots.shtml; http://web.archive.org/web/20050205221034/http://www.newzcrawler.com/faq.shtml; http://web.archive.org/web/20050205013413/http://www.newzcrawler.com/onlinehelp/index.html; http://web.archive.org/web/20050205011615/http://newzcrawler.com/; http://web.archive.org/web/20050205233814/www.newzcrawler.com/index.shtml; http://web.archive.org/web/20050411160752/www.newzcrawler.com/onlinehelp/index.html?postingtonewsgroups.html http://web.archive.org/web/20050523015946/www.newzcrawler.com/downloads.shtml http://replay.waybackmachine.org/20050717014504/http://www.newzcrawler.com/onlinehelp/index.html.

*Primary Examiner* — Joseph E Avellino
*Assistant Examiner* — Marshall McLeod

(57) ABSTRACT

A mobile multimedia content aggregation and dissemination platform is provided that aims to automate the creation, collection, aggregation, and dissemination of RSS and non-RSS information for and to interested parties. This platform may be used for the construction of a personalized blogging agent as well as for a personalized news aggregator.

20 Claims, 5 Drawing Sheets

(51) Int. Cl.
*G06F 17/30* (2006.01)
*G06Q 10/10* (2012.01)
*H04L 29/08* (2006.01)

(52) U.S. Cl.
CPC .............. *H04L 67/26* (2013.01); *H04L 67/28* (2013.01); *H04L 67/2823* (2013.01); *H04L 67/306* (2013.01)

(58) Field of Classification Search
USPC ........................................ 709/217, 218, 219
See application file for complete search history.

(56) References Cited

U.S. PATENT DOCUMENTS

| | | |
|---|---|---|
| 2005/0064852 A1 | 3/2005 | Baldursson |
| 2006/0277191 A1 | 12/2006 | Badovinatz et al. |
| 2007/0162566 A1* | 7/2007 | Desai .................. G06F 17/3089 709/219 |
| 2007/0250577 A1 | 10/2007 | Veeramachaneni et al. |
| 2008/0005263 A1 | 1/2008 | Baraev et al. |
| 2008/0021963 A1 | 1/2008 | Jana et al. |

* cited by examiner

SYSTEM AND METHOD OF PROVIDING A CONTEXT-AWARE PERSONALIZED BLOGGING AGENT

PRIORITY INFORMATION

This application is a continuation of U.S. patent application Ser. No. 11/459,321, filed Jul. 21, 2006, the contents of which is incorporated herein by reference in its entirety.

RELATED INFORMATION

This application is related to U.S. patent application Ser. No. 11/459,327, filed on Jul. 21, 2006, and U.S. patent application Ser. No. 11/459,326, filed on Jul. 21, 2006, now U.S. Pat. No. 7,581,166 (which are both hereby incorporated by reference.

BACKGROUND OF THE INVENTION

Embodiments of the present invention are related to blogging, and more particularly to a system and method that disseminate data content comprised of multiple different data formats for transmission through different protocols and converts the content into a standardized content for use in a user's blog and that can be searched by third party users.

The emergence of RSS (Really Simple Syndication) technologies and weblogs (aka. blogs) has helped transform the Web into a service platform that competes with traditional news media for timely content publication, aggregation, and delivery. RSS is a Web content syndication format and is a dialect of XML. All RSS files must conform to the XML 1.0 specification, as published on the World Wide Web Consortium (W3C) website. Unfortunately, the creation and consumption of such timely blog updates are still done, for the most part, manually on desktop computers today. Moreover, many valuable information sources are not yet available as or integrated with RSS sources or other blogging tools. Furthermore, mobile users want to be able to fully participate in the Web 2.0 [http://en.wikipedia.org/wiki/web_2.0] phenomenon by having the ability to publish and access timely news worthy updates directly from their mobile devices.

Blogging has become a quickly spreading passion among various Internet users. A blog entry is essentially a text entry into a Web page that results in a publication of experiences and opinions. A blog entry can also include images, audio, video, and links to other locations on the Internet. The earliest weblogs were nothing more than updated Web sites with grassroots efforts like Slashdot.org. These early weblogs (blogs) were created and maintained by a small number of people. Readers had to visit the blog sites regularly to get the latest updates. Later, these blog sites began to publish machine readable updates in syndication languages such as in RSS or Atom for easy consumption. Personal blog sites such as Xanga [http://xanga.com] and Blogger [http://blogger.com] allowed Web users to actively write to the Web instead of simply reading from the Web.

The emergence of using RSS technologies along with weblogs for spreading timely and personalized information on the Internet has presented challenges to traditional news and media industries. More and more Internet users are finding that they can acquire informational updates from RSS sources and blog sites faster and easier than before. Rather than remembering to get updates on a daily basis, the bloggers configure their RSS browser to automatically check for specified news updates. Since the updates' format is machine readable, the site can present the results in a summarized format to be shown to the bloggers. This aggregation process (e.g., displaying news headlines with individual items sorted by time) allows one to completely customize a fetched site and have it automatically updated on an ongoing basis. For example and as shown in FIG. 3, an Internet based browser, Flock [http://www.Flock.com], with an embedded RSS reader, allows desktop users to easily aggregate several RSS feeds (such as news sources from CNN, CNet News, NY Times, etc.). An aggregator or news aggregator is a type of computer program (such as application software or a Web application) that collects syndicated Web content, such as RSS formatted information and XML feeds from weblogs. An aggregator is able to subscribe to a feed, check for new content at user-determined intervals, and retrieve the content. It is important to note that presently many RSS feeds are edited by a human prior to being provided as an RSS feed by an RSS provider. RSS is used for syndicated news feeds that may be searchable at Internet sites like Blogdigger.com. RSS is not presently provided for disseminating unedited, searchable information.

In FIG. 3, an example of an RSS data feed based Web page 5 is shown. The source 1 of an RSS feed is provided in the first column. A time (and perhaps date) stamp 2 of the RSS feed is provided in a second column of the display. A subject 3 of the RSS feed and the content 4 of the feed are provided in a text format. The combination of the source 1, time stamp 2, subject 3, and content 4 could be considered a type of blog entry in this particular Web page 5. The contents of the Web page 5 may be constructed from a blog 6 that was generated from an RSS feed or feeds.

As discussed above, the creation and consumption of blogs are mostly performed manually on desktop computers. Moreover, there are information sources that contain timely information about a person's or entity's status or situation, such as one that provides a user's geographic location, a user's appointment/calendar data, or information from various sensor networks (i.e., non-traditional content), but these are neither available or integrated with RSS or other syndicated data sources, nor are they searchable by a third party user. In addition, users are requesting to be able to send, search and receive blog information (perhaps in a condensed form) on their mobile devices or to be able to publish or search audio/video blogs that combine the Web and the richness of a multimedia experience. Furthermore, storage of syndicated data along with non-syndicated multi-media content for usage in a user's blog site while keeping all the information searchable by a third party is not an available feature to date.

SUMMARY OF THE INVENTION

In view of the shortcomings of the aforementioned limitations on blog creation or retrieval, as well as other disadvantages not specifically mentioned above, it is apparent that there exists a need for a system and method that provides a context-aware personalized blogging agent. Embodiments of the present invention provide such a system and method. Embodiments of the present invention also provide a system and method that allows personal blog entries, submitted by a mobile user from any kind of mobile device, to be mixed with information sources from, for example standard and non-standard RSS information sources, to be assembled and included on a user's blog site.

An exemplary method, in accordance with an embodiment of the invention, provides non-RSS content for use in a user's blog. Non-RSS information is provided to a device-aware gateway agent. The non-RSS information may originate from, for example a wireless device such as a mobile phone, personal digital assistant (PDA), a wireless video device, a wireless audio device, or wireless camera device. The gateway receives the non-RSS information and converts the non-RSS information into an internalized well structured format. Such an internalized format may also be a standardized format. M×M is a mobile multimedia content aggregation and dissemination platform. The components that make up its behavior are called infolets. Infolets implement the associated application logic and usually provide access to one or more sources of information. The non-RSS information that has been placed into a standardized format is then provided to a blog infolet. The blog infolet is programmed or contains a module that transforms the non-RSS information, which is in a standardized format, into a blog information item. Each blog information item is stored in a structured format that facilitates the production of a RSS representation or RSS data feed. Thus, RSS data feeds may have originated from normal or traditional RSS data feed providers, such as well known news media sites. Content selected from RSS data feeds or blog information items are selected, based on user defined attributes. Such user selected content may be provided as an aggregated RSS data feed to a user's blog site.

Furthermore, all or a portion of the aggregated RSS data feed may also be provided to a gateway that converts and prepares the portion of the RSS data feed for use or publication on a user's or third party's wireless device.

In another embodiment of the invention, a system is provided that establishes a personal blogging agent for a user. The system comprises a device-aware gateway agent for receiving data that originated from a consumer oriented device. The gateway device converts the data received from the consumer oriented device into a standardized format. A blog infolet receives the data that has been converted into a standardized format and converts it into a blog information item. The blog information item that originated from data provided by a consumer oriented device is stored without human intervention into a database with other blog data items. An RSS feed is created from the blog data items stored in the database. An RSS aggregator is used to aggregate the RSS feed and selected other RSS feeds into an aggregated RSS feed. The RSS feeds that are selected and aggregated into an aggregated RSS feed are based on user designated or defined aggregation attributes. The user designated or defined aggregation attributes may be found in the user's service profile. A user's service profile may also comprise user defined blog item descriptors. The attributes in a user's service profile may also include a user's defined blog item descriptors, which are values or categories for parameters that an infolet will require to sort information in accordance with the user's service profile for a user's blog. The selection and aggregation can also be provided, at least in part, by using a multi-dimensional clustering algorithm. The resulting aggregated RSS feeds are provided to a publication infolet that processes and/or directs the aggregated feeds to a user's blog.

Furthermore, other users with devices may receive portions of the aggregated RSS feed converted into a data format that is compatible with the device in use.

This summary of the invention is not intended to discuss or represent each embodiment or every aspect of the present invention.

BRIEF DESCRIPTION OF THE DRAWINGS

Other objects, features, and characteristics of the invention as well as methods of operation and functions of related elements of structure, and the combination of parts and economics of manufacture will become more apparent upon consideration of the following Detailed Description of Embodiments of the Invention and the appended claims with reference to the accompanying drawings. All of which form a part of the specification wherein like reference numerals designate corresponding parts or elements in the various figures that may not be drawn to scale, and wherein:

DETAILED DESCRIPTION OF THE EMBODIMENTS OF THE INVENTION

Embodiments of the present invention provide a mobile multimedia content aggregation and dissemination platform that automates the creation, collection, aggregation, and dissemination of RSS and non-RSS information to interested parties, whether the interested parties are using desktop computers (desktops) or mobile devices. It should be understood that RSS information is just one type of a syndicated content format. Thus, it should be understood that embodiments of the invention are not just limited to RSS, but may provide a content aggregation and dissemination platform that automates the creation, collection, aggregation and dissemination of one or more syndicated content formats and non-syndicated content information to interested parties. An example of another syndicated content format that is not RSS, is the content format known as ATOM. An exemplary platform converts data or postings from various information sources (sensor networks, location servers, calendar servers, news sources, etc.) into a format that can be aggregated automatically along with blog entries submitted manually by users. Intelligent mechanisms are provided to query and filter the aggregated content and to adapt the content for dissemination to subscribers who are interested in relevant topics. Various embodiments of the invention are related to automating the aggregation of RSS feeds thereby allowing a user to view updates and data from selected Web sites that are correlated with non-traditional RSS content that the exemplary platform assembles, based on, for example, a user's personal profile. Note that, as a by-product of an exemplary platform, a user does not need to have an RSS browser to get timely updates. Exemplary embodiments may be backward compatible with previous mobile service platforms in the sense that an exemplary platform can disseminate content by using existing communication channels that communicate to a wide range of devices, including cell phones, pagers, PDAs, and other personal electronic wireless devices.

RSS which was originally short for RDF Site Summary or Rich Site Summary, but now is generally know as Really Simple Syndication, is an XML format for syndicating Web content. A Web site that allows other sites to publish some of its content may create an RSS document and may register the document with an RSS publisher. A user who can read RSS-distributed content can use the content on a different site. Syndicated content has historically included such data as news feeds, events listings, news stories, headlines, project updates, excerpts from discussion forums, or even corporate information. The RSS content has also historically always been edited by a human prior to becoming syndicated Web content. RSS was originally developed by Netscape.

Figure 1:
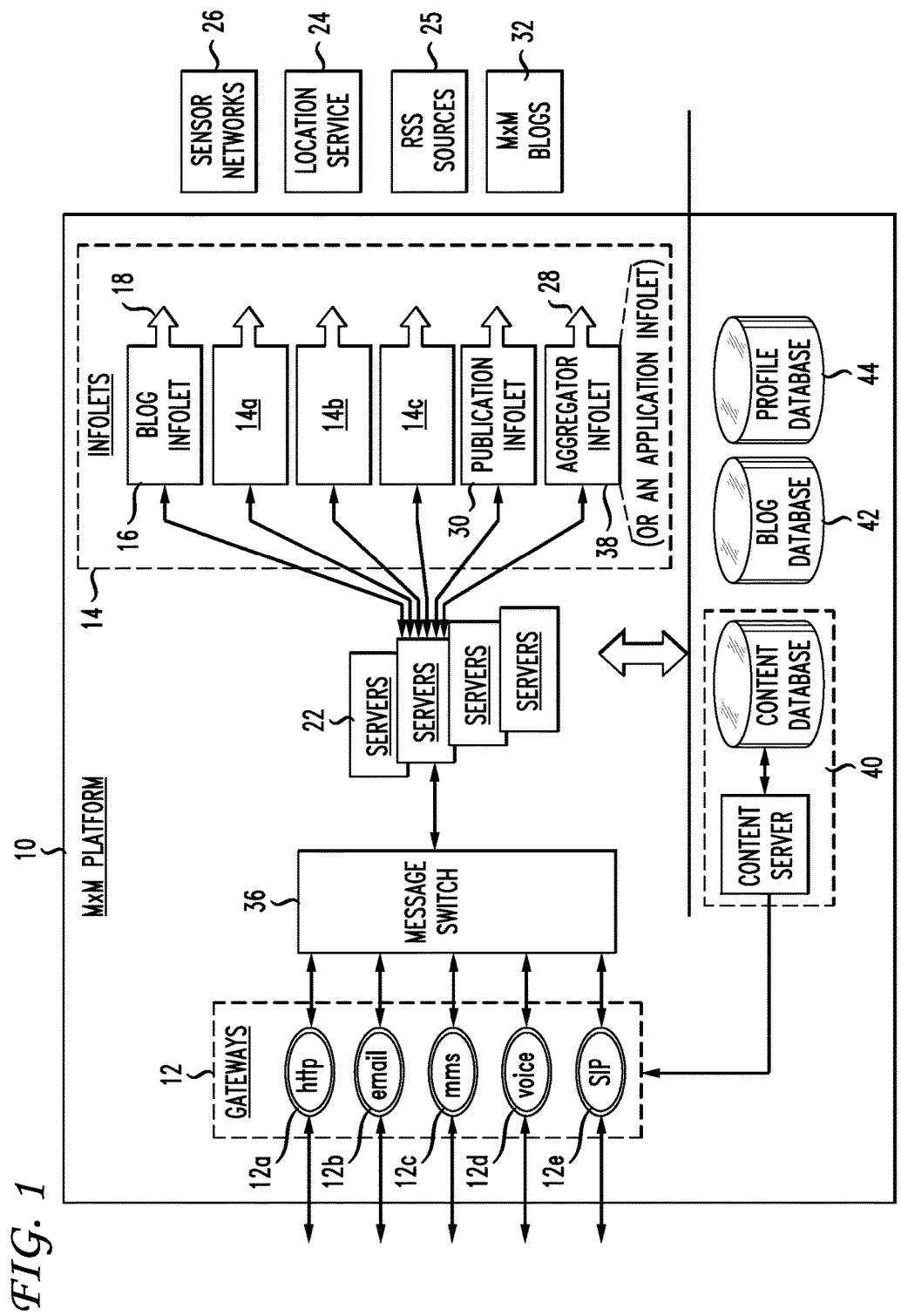
FIG. 1 is an architecture diagram of an exemplary mobile multimedia content aggregation and dissemination platform.

An architecture diagram of an exemplary mobile multimedia content aggregation and dissemination platform (M×M Platform) 10 is shown in FIG. 1. The exemplary platform 10 handles timely updates from various information sources. The platform 10 consists of gateways 12 that send and receive messages and data to and from non-platform devices using different protocols (i.e., http, mail, sms, mms, voice, fax, SIP, instant messaging, etc.). The exemplary platform 10 further comprises infolets 14. The infolets 14 implement associated application logic and usually provide access to one or more sources of standard and non-standard information. An infolet's output needs to conform to the destination delivery context established for the user session. The platform 10 offers support for information transcoding (format conversion) in the form of a framework that can be used by the infolet provider. For example, the blog infolet 16 converts a blog entry submitted from any of the gateways 12 into a blog information item 18. RSS-enabled infolets 14 a, b and c, operating with each server(s) 22, implement protocol interfaces that access various information sources (such as a location service 24, RSS source service 25, sensor service 26, etc.). Such infolets 14 also include and implement a module that converts the retrieved information from the various services 24 and 26 into a properly formatted RSS data feed. In general, the conversion of retrieved information into RSS feeds is performed in a timely manner by an infolet making the data amenable for aggregation with other sources of information. The blog infolet 16 is also capable of presenting its information in an RSS feed.

The aggregator infolet 38 assembles RSS feeds from the server(s) 22 to provide a unique aggregated RSS feed 28. This aggregated feed 28 is then ready for querying, filtering or publishing to other media gateways. Note that the aggregator infolet 38 can be any application infolet that uses an aggregator library and handles the actual aggregation task. Content from the aggregated feed 28 can be adapted and provided for delivery to subscribers who are interested in any event reported in the aggregated RSS feed 28. The aggregation itself takes into account user preferences and/or the user's service profile that may be specified as weights of the aggregation criteria. This aggregation procedure is a weighted clustering mechanism. The publication infolet 30, for example, is used to publish personalized and filtered RSS content from the aggregated feed 28 onto a user's personal or group blog site 32 maintained by the platform 10. A delivery module inside the blog infolet 16 or the aggregator infolet 38 is used to adapt user selected portions of the aggregated RSS feed (18 or 28) for delivery as content to users' mobile or other gateway 12 related devices.

A user's service profile is where a user defines the attributes used to describe the data items or services provided in the user's blog. Such attributes may include, but are not limited to a time, location, direction, type, hobby, event, genre, species, culture, religion, size, shape, color, any physical attribute, topic, etc. For example a user may have a blog site that is about Ford Mustang automobiles. The user may define attributes for the blog item descriptors based on an automobile brand, model, year, color, part, date, geographic location, VIN, level of customization, just to name a few. These user defined attributes may not be related or similar to standardized RSS data attributes that are commonly accepted by the media houses that produce the standardized RSS feeds.

Still referring to FIG. 1, wherein the exemplary platform 10 is shown, additional detail is now provided. The gateways 12a-12e receive and provide information to various different kinds of mobile and non-mobile devices that incur different protocols. For example, if a person has a mobile phone, the user may use the phone to contact the voice gateway 12d by calling a phone number associated with the voice gateway 12d. The user may talk directly to the voice gateway 12d. Whatever the user says on his mobile phone to the voice gateway 12d will be recorded and transcribed via a voice-to-text module (that may be implemented on a set of servers that act as a resource outside of the platform 10) and become a blog entry that is submitted to the platform 10. The user who called the voice gateway 12d can be identified by a voice PIN number matched against a profile database 44. The voice gateway stores the voice message in the content database and tags the voice blog entry from the user with an identification pointer so that the blog infolet 16 can store information in the blog database 42. Information stored in the blog database 42 may be stored as blog information items that have tags, pointers or URLs (herein collectively "pointers") associated therewith that comprise a descriptor or description for each blog information item. The original recording is stored and alternative representations can be created, for example, through TTS whereby an audio file can be effectively created. The blog entry will later be posted to the specific user's blog site. Additional information about the voice gateway 12d is provided below in the discussion of FIG. 2C.

If a user uses a cellular/mobile phone or a desktop computer that allows him to send email, the user can use the email gateway 12b to submit blog entries. The user emails the blog entries to a specific email address for either his blog entry or a general email address that tags the entry and determines where the blog entry should go based on looking up the originating address of the email in the profile database. Below, more discussion about the email gateway 12b will be provided with respect to FIG. 2A. Web pages can be similarly provided to the http gateway 12a. Video blog entries could be provided to the SIP gateway 12e (see, discussion of FIG. 2D). Multimedia messages can be provided by a user to the MMS gateway 12c as well (see, discussion of FIG. 2E).

A user, who is using a mobile device, may send information to any one of the gateways 12. The gateways receive information, whether it is oral, written, photographic, audio, or video, then stores the media content in the content database 40 and standardizes the information with pointers to the media content in a predetermined fashion. The standardized information is provided to the message switch 36.

The message switch 36 basically separates the gateways 12 from the servers 22. In some embodiments of the invention, the gateways are considered front end gateways and the servers 22 are considered back end servers. Any request or data that comes into the platform 10 via any of the gateways 12 can be sent, via the message switch 36, to any of the servers 22. The message switch 36 may handle load balancing of the incoming or outbound information and data, which is a somewhat typical way of handling application messaging.

The servers 22 comprise database storage capacity and may be considered a large storage container for many of the pieces of blog information that flow in and out of the exemplary platform 10. The servers 22 are associated with multiple infolets. The infolets are in data communication with the servers 22. An infolet (16, 14a-14c, 30, 38) is a data receiver that is configured to receive information in one format and translate the information into, perhaps, another format.

Referring first to the blog infolet 16, when the gateway 12 receives a request from a user, the gateway determines that the request should go to the blog infolet 16 if the request is one from the user requesting that the information provided be included into the user's blog site. If the information is intended for the user's blog site, the information is passed from the gateways 12 through the message switch 36 to the blog infolet 16 wherein the information is formatted appropriately and provided for proper storage into the blog database 42.

Referring now to FIGS. 2A-2E, exemplary block diagrams of the gateway agent 12 and the blog infolet 16 along with some associated databases 40, 42, and 44 are provided.

Figure 2A:
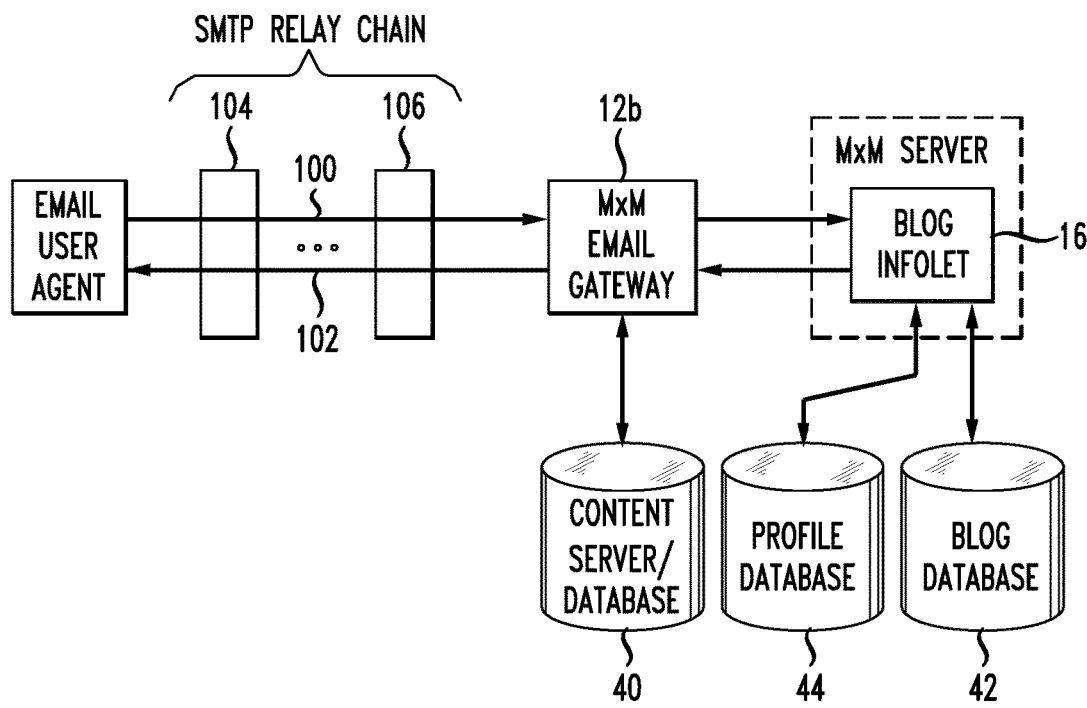
FIG. 2A is an exemplary block diagram architecture of an email gateway, a blog infolet and associated databases.

For example, in FIG. 2A, when a mail gateway 12b receives a piece of non-RSS content from a user and the content is, for example, a picture, the picture (e.g., the jpeg data, bmp data, etc.) will be stored in a content database 40. The mail gateway 12b receives a pointer from the content database 40, which points to the location of the stored picture content in the content database 40. The mail gateway 12b sends the pointer, via the servers 22 to the blog infolet 16. It is important to understand that the mail gateway 12b can receive blog items from multiple users in multiple formats including picture, text, graphics, audio, and video data formats. In embodiments of the present invention, text data is sent directly through the message switch 36 to the blog infolet 16. But, other data items like video and picture data are stored in the content database 40 or other storage mechanism while a pointer to their location in the database 40 is provided to the blog infolet 16. The platform 10 can also be set up such that only predetermined content types are published to the content server 40.

Still referring to FIG. 2A, bi-directional communication 100, 102 to the email gateway 12b is carried out via a set of SMTP relays 104, 106. When an inbound user request 100 arrives at the email gateway 12b, an authentication procedure is performed to determine the identity of the user initiating the request. The content that is attached to the request is published to the content server/database 40. In return, URLs for each piece of content published to the content server/database 40 are provided to and obtained by the email gateway 12b. The publication of the content in the content server 40 by the email gateway 12b is one step of a content processing chain that occurs in the gateway. Such a content processing chain is the assembly of a set of content processors with each performing one dedicated operation on the content. The result being a structured format of non-RSS information that can be provided by the email gateway 12b to the blog infolet 16.

The inbound user request 100 that has been changed by the email gateway 12 into structured non-RSS information contains the URLs for each piece of content published to the content server 40 instead of the actual content submitted by the user. A part of the content is identified by the email gateway 12b as being a command line and is sent along in the request (i.e., the structured non-RSS information). Furthermore, the types of content in the request that are published in the content server 40 and the types of content that should be propagated directly to the blog infolet 16 can be configured in the email gateway's content processing chain.

After taking into account user defined preferences that have been stored in a user profile database 44, the blog infolet 16 stores a blog information item (e.g., a blog entry) into the blog database 42. The blog entry contains the URLs that point to the user supplied content now residing on the content server 40. In some embodiments of the invention, a confirmation of receipt of the blog information item containing an identifier of a new blog entry is provided back to the user from the blog infolet 16, through the email gateway 12b and by the SMTP relay chains 106 and 104.

Conversely, still referring to FIG. 2A, if a user request, indicating that the blog information item or the entire blog is desired, is sent to the blog infolet 16 in the server platform 10, then the user preferences are accounted for via the profile database 44. Then the blog information is retrieved from the blog database 42. The blog infolet 16 then provides the retrieved blog information, in accordance with the user's service profile, to the email gateway 12b. The retrieved blog information will contain the appropriate URLs of any data associated with the content at the time of original content submission.

Because SMTP messaging requires the actual content to be embedded in the message, the email gateway 12b retrieves the associated data from the content server 40 using the URLs while composing the outgoing MIME message. The outgoing MIME message is sent via the SMPT relay chain 106, 104 to the user.

Figure 2B:
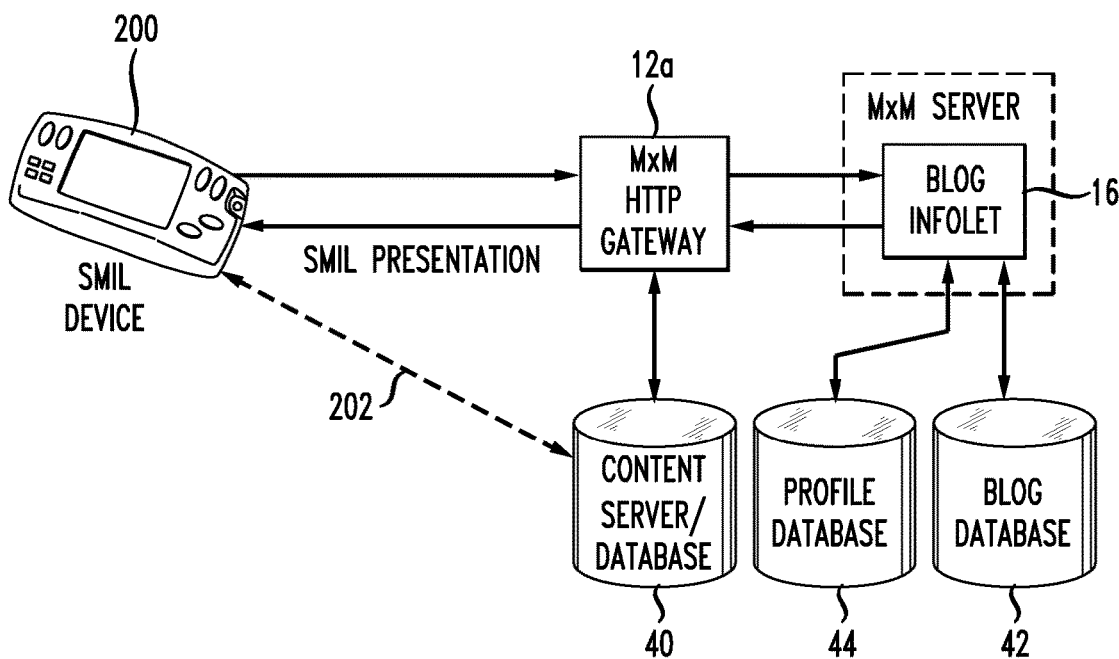
FIG. 2B is an exemplary block diagram architecture of Synchronized Multimedia Integration Language (SMIL) retrieval through an HTTP gateway, a blog infolet and associated databases.

FIG. 2B is an exemplary block diagram architecture of SMIL retrieval through the HTTP gateway 12a, a blog infolet 16 and associated databases. When a user retrieves content of a blog via a SMIL client 200, the SMIL document (presentation) returned by an exemplary platform 10 contains, due to SMIL specifics, only the URLs of the requested content. It is the user agent that needs to retrieve the actual content, using the URLs, from the content server 40 (shown via the dotted arrows 202 between the SMIL device and the content server/database).

SMIL clients 200 can access the platform 10 via the HTTP gateway 12a and presently can only be used for retrieval of content. The blog infolet 16 executes a content selection step in this situation because content such as Word documents, PowerPoint presentations, etc. (in general application/*content types) cannot be a part of a SMIL presentation.

Figure 2C:
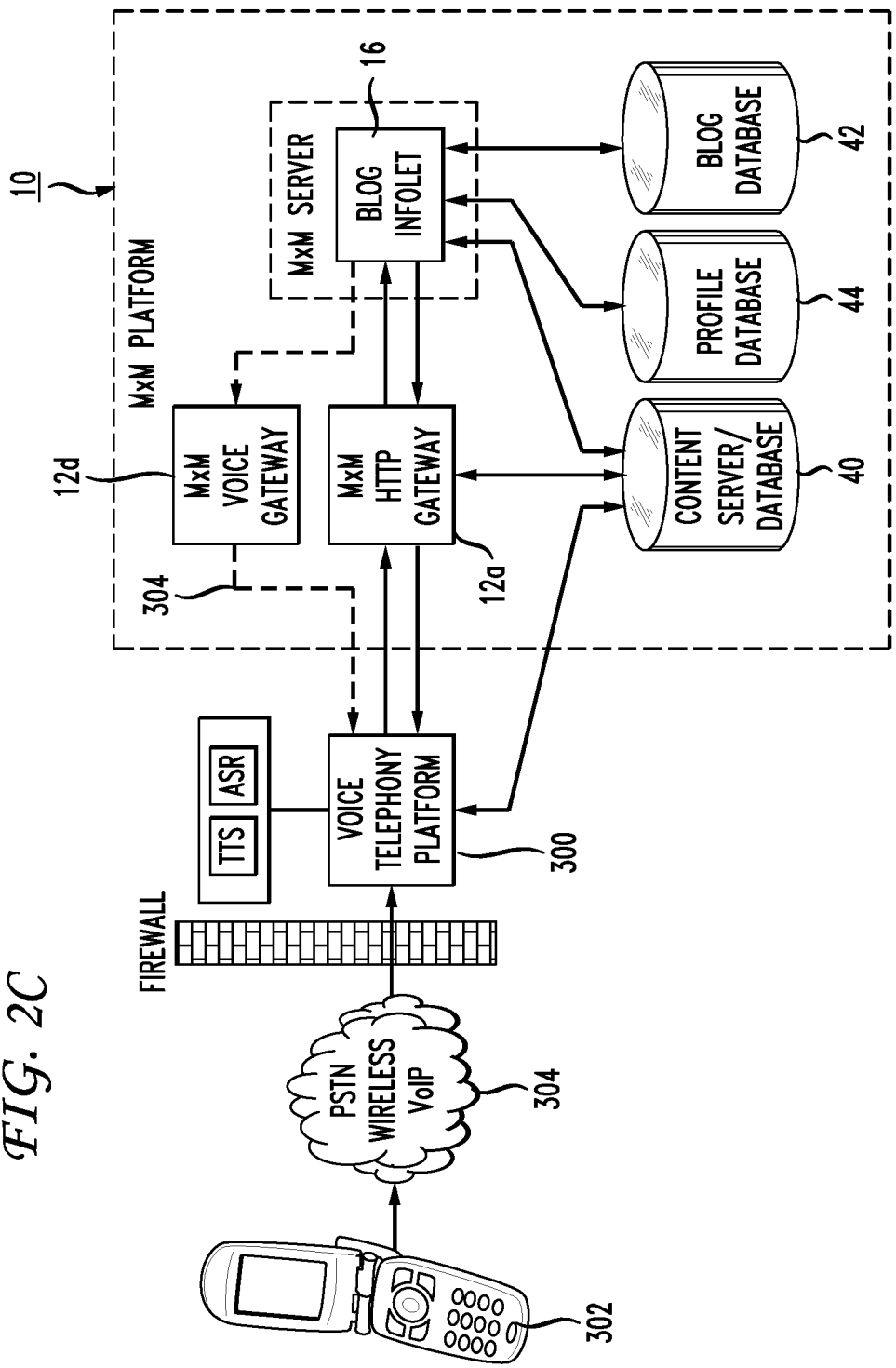
FIG. 2C is an exemplary block diagram architecture of a voice gateway, a blog infolet and associated databases.

FIG. 2C is an exemplary block diagram architecture of a voice gateway 12d, a blog infolet 16 and associated databases. A few things are specific to voice based interactions, although they do not radically change the flow of information. In the context of blogging by voice, whether a user publishes an audio recording or retrieves a blog, all interactions (navigation menus) are presented via the voice telephony platform 300. When content is being requested by a voice device 302 (e.g., mobile phone, telephone, VoIP phone and the like), the content is provided by the HTTP gateway 12a. The voice gateway 12d is used only when the blog infolet 16 autonomously decides to push out a phone call to the end user, for example, in the case where a user is subscribed for some events to be automatically delivered by the platform 10 as a notification service 304 (shown by the dotted line).

The voice telephony platform 300 manages calls via PSTN/Wireless/VoIP networks 304. The voice telephony platform basically operates as a VXML engine. The voice telephony platform 300 retrieves VXML content, which directs the dialog with the user, via HTTP from HTTP gateway 12a. The HTTP gateway 12a recognizes the HTTP requests as coming from a telephony platform 300 and creates the appropriate delivery context for the session; most importantly, the HTTP gateway 12a requests that the blog infolet 16 presents its functionality through VXML.

When content (a voice recording) is submitted by the user for publication in, for example, the user's blog, the content will appear to the HTTP gateway 12a as a multipart encoded form. Audio recordings can be converted to text using an external resource (ASR) and provided to and stored in the content database 40, if needed. Similar to other gateways 12, as part of the content processing, the content is published to the content server 40 and corresponding URLs are sent to the HTTP gateway 12a. This is true for all user interactions going through the HTTP gateway.

An exemplary method for publishing a wired or wireless telephone blog submission may be performed as follows. First a user dials into a predetermined number in order to request publication of a voice originated blog information. The user may then be authenticated via a voice or user entered PIN. Alternatively, the user's device ID may automatically authenticate the user. A menu, either oral or via a popup screen is provided to the user's voice device 302 by the HTTP gateway 12a. Next the user selects the desired option from the menu, for example, "record a voice entry for my blog", and proceeds to speak into the voice device so that the content is recorded into the HTTP gateway 12a. The HTTP gateway 12a stores the content into the content server/database 40 and in return receives a URL providing the content's location. The blog infolet 16 is informed of the URL for the content published in the content server 40. And, the blog infolet sends a successful response to the user's voice device 302 via the HTTP gateway 12a and voice telephony platform 300.

Retrieval of voice content from the exemplary platform 10 is a bit different from retrieving other types of content. VXML only allows for voice and text content (presented through TTS) to be included in the content presented to the user, thus a content selection step is needed to eliminate other types of content.

Another difference here is caused by the fact that voice content must be included by reference and text content must be included through inlining (inserting text into the vxml), which means that audio content will use the URLs. As such, the voice telephony platform 300 retrieves the audio content while the text content is directly retrieved by the blog infolet server 16 and included in the vxml sent to the HTTP gateway 12a and further onto the voice telephony platform 300.

An exemplary method of providing an audio segment from a blog in response to a user's voice request may comprise a user requesting to listen to a blog by dialing in to a predetermined number from a voice device 302. The user will then authenticate himself via an authentication processes. Next the user may be presented with an audio or visual menu provided by the HTTP gateway 12a via the voice telephony platform 300. The blog infolet 16 will then construct the presentation for stored audio content by referencing and inserting text components to be rendered by TTS (Text to Speech). The voice telephony platform 300 will then fetch audio appropriate audio segments, according to the provided URLs, from the content server 40 and play the content back to the user via the voice device 302 and the necessary connection 304.

Figure 2D:
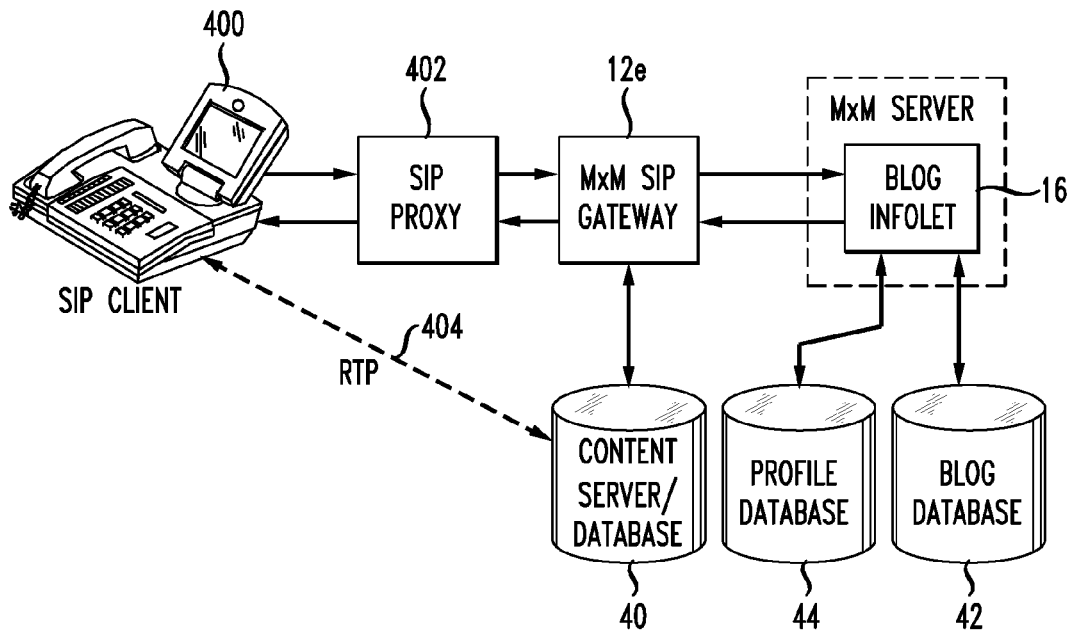
FIG. 2D is an exemplary block diagram architecture of session control and video retrieval through the SIP gateway and media server respectively, a blog infolet and associated databases.

FIG. 2D is an exemplary block diagram architecture of video publication and retrieval through the SIP gateway, a blog infolet and associated databases. For video publication, a SIP user agent (UA) 400 invites the SIP gateway UA 12e via an external SIP proxy 402. The SIP proxy 402 discovers SIP gateway UA 12e via a naming service (not specifically shown). The SIP gateway 12e instructs the content server 40 (or media server) to open an RTP session 404 with the SIP client 400 and stores the incoming video to a named filename therein. The SIP gateway 12e collects a URL for the stored file. The SIP gateway 12e then forwards the request and the collected URL pointing to the content to the blog infolet 16. This lets the blog infolet 16 know that a new item has been published and is referenced by the URL.

For video retrieval, the SIP user agent (UA) 400 invites the SIP gateway UA 12e via an external SIP proxy 402 to provide video content from a blog. The SIP proxy 402 discovers the SIP gateway UA 12e via a naming service. The SIP gateway 12e then forwards the video retrieval request to the blog infolet 16. The blog infolet 16 retrieves the user's page and aggregates information from other infolets or information sources (if necessary) based on the request. The blog infolet 16 uses an aggregator library to combine the various feeds into a single RSS feed and adapts them for delivery to the SIP gateway 12e. The SIP gateway 12e will then instruct the content server 40 (or media server), using the appropriate URL(s), to open an RTP session 404 with the SIP client 400 to send the video to the end user.

Figure 2E:
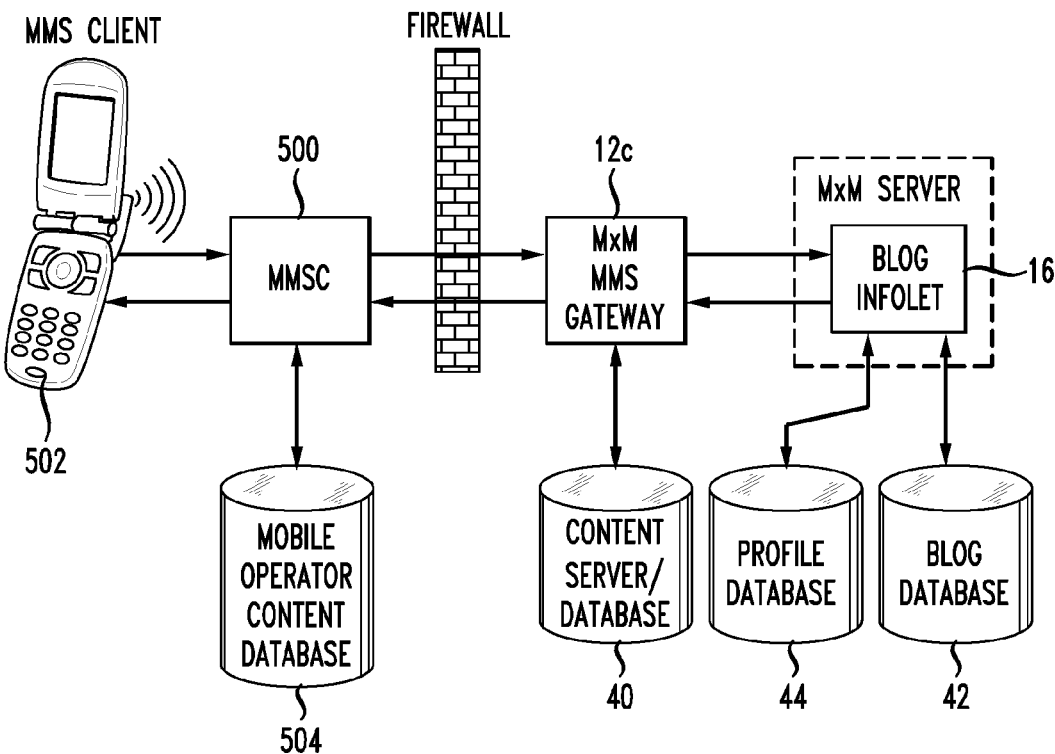
FIG. 2E is an exemplary block diagram architecture of a MMS gateway, a blog infolet and associated databases.
Figure 3:
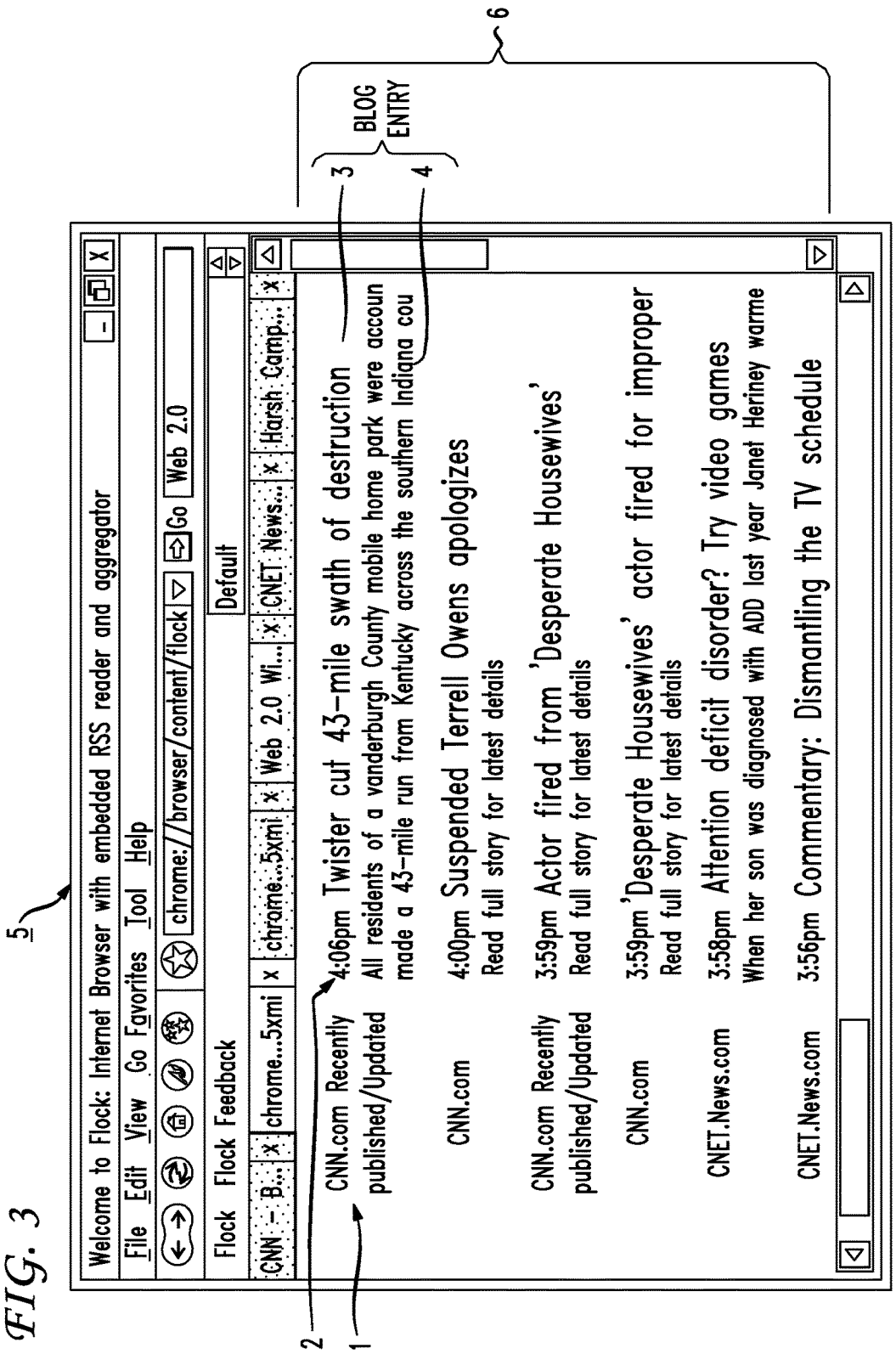
FIG. 3 is an example of an Internet browser, Flock [http://www.Flock.com], with an embedded RSS reader and aggregator.

FIG. 2E is an exemplary block diagram architecture of a MMS gateway 12c, the blog infolet 16 and associated databases. When content (a SMIL encoded MMS message with text/image/audio/video components) is submitted by the user for publication to a blog, it will appear to the MMS gateway 12c as a multipart encoded form. The MMS gateway 12c communicates via MM7 (or other standards like ParlayX) to a mobile operator MMSC 500. Similar to other gateways 12, as part of the content processing, the whole structure of this content (SMIL encoded message plus the components) will be published to the content server 40 and corresponding URLs will be sent in the request to the blog infolet 16. MMS messages are sent by associating the MMS gateway 12c and blog infolet 16 with a particular short code. Users can publish multimedia messages to the MMS gateway 12c. A response is sent back to the user by the platform 10 indicating success or failure.

For retrieval of multimedia information, users request a particular MMS message to be sent to, for example, their wireless device 502. The MMS gateway 12c communicates via MM7 (or other standards like ParlayX) to a mobile operator MMSC 500. SMIL content is assembled by the MMS gateway 12c or retrieved if previously published to the content server 40 and is sent to the MMSC 500. The SMIL content includes the actual components (not only the references). The MMSC 500 stores the content locally in the operator's database 504. The user may then retrieve the content from the operator's database 504.

Referring back to FIG. 1, the blog infolet 16 assembles the blog entries from the user and stores the blog entries in the blog database 42 along with their associated blog item descriptors and/or pointers. The associated blog item descriptors and/or pointers point or are associated with data that is stored in the content database 40, that is associated with images, video, and/or audio data associated with a specific user. The blog database 42 stores the configured blogs and associated pointers and blog item descriptors of the various users in or associated with the servers 22. The blog database 42 may be a relational database (RDB). Other formats for the blog database 42 could be used. An important aspect of the blog database 42 is that it is used to generate an RSS feed or feeds. This is important because later in the exemplary platform's process, the RSS aggregator infolet 38 aggregates RSS feeds. RSS feeds do not include video, audio, photograph, or graphic content, but instead are limited to specific RSS feed requirements and specifications. The RSS or MediaRSS (an extension for referring to and describing multimedia content associated with RSS items) content may include tags, pointers or URLs that provide the location of stored audio, video, or graphic content. The exemplary system 10 may also use other extensions with standard RSS, for example, such extensions may provide annotations to an entry with additional descriptive information about the entry. Thus, the pointers provided from the gateways 12, in association with the content server 40, allow a blog site to locate and find the associated video, audio, or picture information from the content server 40 at a later time using the RSS feed information because the pointers are part of or incorporated into the RSS feed.

To summarize, with respect to the blog infolet 16, it is important to understand that the blog infolet 16 stores or aids in the storage of blogging information. It stores content information in the content database 40. The blog infolet keeps text and related pointers that identify content or media content in a content database 40.

Referring now to infolets 14a-14c, these infolets can generally be instructed to turn on or become active on a periodic basis in order to collect information from a variety of information sources. The infolets 14a-14c may be collecting and providing information on a continuous basis, be activated and turned on at predetermined times, or might receive queries from the servers 22 requesting the collection of predetermined types of information. For example, infolet 14a is a sensor infolet in the exemplary embodiment. The sensor infolet 14a may collect information from sensor networks 26. A sensor network 26 may be a network of sensors that includes sensors for radio frequency identification (RFID), temperature, pressure, weather information, velocity information, acceleration information, health/medical condition of a patient, and substantially any information that can be provided by a sensor. Such sensors could be located geographically anywhere. As an example, assume an RFID sensor is being queried in the sensor network 26. If an RFID tag is attached to a person, who is a user and/or blogger, a sensor network 26 within, for example, the user's office building or university campus, may sense that the RFID tag on the user is nearby. Thus, the RFID sensor may send a signal through the sensor network 26 to infolet 14a indicating that the specific user is at or in a specific classroom in a particular building on a college campus. When the user with the RFID tag leaves the specific classroom, the sensor network may report to the infolet 14a that the specific user is no longer in the specified classroom in the building on the university campus. As the user moves around the university campus, information can be received, constructed and translated into a blog information item, and in some circumstances an RSS format, by the infolet 14a and then provides it to the servers 22 for generation into an RSS feed. Times, switch openings or closures, temperatures, pressures, flow rates, light intensity, weather readings, velocities or other sensor generated data can be retrieved from a sensor network. The RSS feed providing information about the user's location can then be used for updating the user's blog site. Sensors may also be used to collect real-time or near real-time information about physical entities (such as cars, buses, buildings, trains, aircraft, pool equipment, assembly lines, chemical plants, oil rigs, traffic conditions, etc) not just regular users, and the information may be used to update blogs on, or relating to these entities automatically in real or near real-time.

In addition, suppose that the same user walks off the college campus and out into an open field or other part of the city and is carrying a mobile phone or other mobile or wireless communication device. The mobile communication towers or system in the area may be able to locate the user's location and provide the user's location to the location service 24. The location service 24 would then provide the location information to infolet 14b along with a time stamp. Infolet 14b would then convert the information to an RSS format and provide an RSS feed stating that the user was located at a particular location at a recorded date and time. For example, user Dave was located at the New York La Guardia Airport at 10:30 a.m. on Jul. 2, 2006. The granularity of the information provided by the location service 24 or network sensors 26 depends on the actual location or sensor devices.

Infolets 14a and 14b provide RSS feeds that originate from unedited, non-RSS data sources while the blog infolet 16 provides additional blog information items to servers 22 from the gateways 12. These blog information items, after being converted into RSS feeds, can be sorted by the RSS aggregator infolet 38 by essentially any attribute defined or selected by the user. For example, the RSS feeds could be sorted by time stamps in accordance with the time that the feeds were created or generated. The RSS aggregator can sort or cluster the RSS feeds associated with a particular user by, for example, the length of the RSS feeds, the originating source device that created the RSS feeds, the geographical location where the RSS feed originated, pointer data associated with the RSS feeds, the popularity of the RSS feed, the time of day that the RSS feed was generated, etc., or any combination thereof. Every RSS feed may have a plurality of attributes associated with it. Such attributes could be used for aggregating and/or sorting purposes. Attributes may include, but are not limited to originating source, time stamp, date, author, geographic location, service provider source, size, data type, licensee, licensor, country of origin, popularity, subject topic, gender, classification, index number, to name a few. An annotation structure can be defined either at the RSS level or at the RSS item level. In the case of the blog infolet, both annotation structures are user defined.

As such, an embodiment of the invention may provide a method of clustering blog information items. Some or all of the blog information items may have originated from a non-RSS data source. Other information items may be from RSS data sources. Both the non-RSS data items and items from RSS data sources are aggregated into an RSS data feed using the following method or process. The blog information items are first stored in a database. Each of the blog information items that are stored in the database has attached to it a plurality of annotations that may help to define and categorize a stored blog item. The annotations may include centroid based annotations, hierarchical annotations, or density based annotations. The stored blog items can be sorted, via the annotations, using a multi-dimensional clustering algorithm or other appropriate sorting techniques. The algorithm takes into account user defined preferences by assigning a weight to each dimension in the multi-dimensional clustering or sorting algorithm. As a result, an aggregated RSS feed is created that meets the user defined preferences of a user's blog site or data needs.

In another embodiment, a user may also request that a calendar source (not specifically shown) be used as another information source to provide user's appointment and/or calendar information either from any users' PDA (personal digital assistant) or electronic organizer or from a calendar server such as Microsoft Exchange Server. Such information could be received through an infolet 14 and could be provided to the servers 22 for storage as an RSS feed or blog information item. The information could then be aggregated by the RSS aggregator infolet 38.

The servers 22, in conjunction with the content database 40 and the blog database 42, store a plurality of formatted data structures from the various users of an exemplary platform 10. The various created RSS feeds are aggregated by the RSS aggregator infolet 38 into new RSS feeds. Embodiments of the present invention provide aggregated RSS feeds to multiple users. The RSS aggregator infolet 38 aggregates multiple different RSS feeds for a variety of end users. Aggregation of the various feeds can be performed using load balancing techniques and/or with multiple aggregators handling the loads. A filtering mechanism can be used for aggregating the RSS feeds 28 or a simple filter that picks out all the data items that belong to a specific user, say user 1, while another simple filter picks out data items in the aggregated feed 28 for user 2 can be used.

At this point, the RSS feeds 28 coming out of the RSS aggregator infolet 38 can be provided to the publication infolet 30. The publication infolet 30 directs the appropriate aggregated RSS feeds to designated users' blog sites 32.

A user's blog site will use the RSS aggregated feed that has been aggregated in a user defined manner and produce the blog site. For example, if a user is traveling through France and the user has set up his blog site to organize aggregated RSS data sent to it by a time stamp, the blog site may first show a picture of the Eiffel Tower, which was captured by the user's mobile phone camera and emailed to the mail gateway 12b. Then it may include some text that the user sent via text messaging to the exemplary platform via the SMS or MMS gateway 12c. After that, the blog may include a piece of news that occurred on that particular day that had to do with the Eifel Tower and originated from an RSS news source 25. Next, the blog site may include a telephone message that was received by the voice gateway 12d and was transcribed into text via a voice-to-text module. After that, a short video clip may be provided wherein the user videotaped a street vender that he found interesting and forwarded to the appropriate gateways 12. Next, a sensor network (e.g., an RFID network) may have picked up that the user had actually entered into the Eifel Tower and provided the date and time when that occurred, along with the date and time that the user left the Eifel Tower. The user may then have entered a calendar appointment on his PDA that indicated that tomorrow he plans to visit the Louvre Museum to look at pictures and paintings at 2:30 pm and as such, this information may show up on the blog site so that those who are interested may know when to look at the blog site again for information and perhaps pictures of the blogger's visit to the Louvre Museum.

In additional embodiments of the invention, a delivery module inside the blog infolet 16 or the aggregator infolet 38 allows a person, who is interested in knowing what the particular blogger is doing, to request that information be "pushed" to his mobile device or desktop instead of having to actively access the particular blogger's site. The delivery module receives portions of the aggregated RSS feed intended for a particular user and sends the portions to the message switch 36. The message switch 36 will then, in turn, provide the selected portions of the RSS feed to the appropriate gateway device that was requested by the interested party and the gateway 12 forwards the information to the interested party's mobile or other device.

For example, if Suzie is interested in what Bob is doing in Paris, Suzie may request via an exemplary network, that Bob's blogs, with respect to Paris, be forwarded to her mobile phone. As such, the appropriate RSS feeds would be provided through the delivery module, through the message switch 36, and to the various gateways 12. The gateways 12 forward the portions of the RSS feed that Suzie is interested in viewing via, perhaps, the mail gateway 12b, the MMS gateway 12c, the voice gateway 12d, and maybe even the SIP gateway 12e, all which may be received by Suzie's mobile phone (assuming Suzie's mobile phone can process the various types of data). If Suzie only wanted the information to be received, for example, on her fax machine, Suzie may have requested that the appropriate RSS feeds, which could be sent to a fax machine, are sent through an appropriate fax gateway 12 (not specifically shown).

It should be understood that the aggregated RSS feeds created by embodiments of the present invention provide RSS content that is an aggregation of both edited and unedited RSS data, resulting in unedited content published directly to and on a blog site or provided to interested users via the various gateways 12. In the past, much RSS content was edited by a human before being provided as an RSS source. RSS feeds from, for example, original sensor network data or voice-to-text inputs originating from a consumer's mobile phone have never been available, but an unexpected need for such types of data is now present. Embodiments of the present invention use presently unorthodox sources of data, such as sensor networks, location services, unedited voice from mobile phones, as the sources for creating original and unedited RSS content that can be made to be searchable. Such items have not been used in the past to originate and generate unedited RSS content.

Each infolet, in embodiments of the invention, may contain an RSS conversion module that receives and understands the protocol of the data interface of the outside data source. The module receives data from an outside data source and converts the data to the RSS data protocol that is accepted by the exemplary platform's data interface. For example, infolet 14a understands the protocol of the information coming from the sensor networks and is able to transform that sensor network information into RSS content without human intervention. Furthermore, the blog infolet 16 understands information coming from the various gateway sources 12 and, as discussed above, will forward the RSS text information to the servers 22, but only provide a pointer to the servers 22 of any associated non-text information. The RSS content will provide the pointers to a blog site so that the related non-text information (i.e., pictures, video and music, and audio) can be included in a published blog or provided to an interested user's mobile device.

In another example, if a location service 24 is being used, there may be a location interface for a user to get location information out of the service (i.e., a location service Web site). Prior to embodiments of the present invention, there was no RSS content provided from location services. An exemplary location service infolet 14b would thus provide components that translate information service data into RSS formatted data. The location service infolet 14b gets information from a particular location source. Once the location infolet 14b gets the information from the location source, the location infolet 14*b* has a module that converts the location service information into RSS formatted content. The various infolets 14*a*-14*c* each are programmed to convert information from a non-RSS source (i.e., sensor networks, location services, calendar services, etc.) into RSS content. Once the infolet gets the information from the information source, it converts the information into a common RSS language. The RSS aggregator is used to aggregate RSS content that originates from a variety of sources for the user. Embodiments of the present invention enable a platform 10 to communicate with different information sources that do not provide RSS data or content and to convert the non-RSS content into RSS content for utilization by various blog users.

Although only certain embodiments of the apparatus of the present invention have been illustrated in the accompanying drawings and described in the foregoing Detailed Description, it will be understood that the invention is not limited to the embodiments disclosed, but is capable of additional rearrangements, modifications and substitutions without departing from the invention as set forth and defined by the following claims. Accordingly, it should be understood that the scope of the present invention encompasses all such arrangements and is solely limited by the claims as follows:

What is claimed is:

1. A method comprising:
   identifying user-defined attributes associated with a topic of a blog of a user;
   receiving a non-syndicated image having standardized data attributes, wherein the non-syndicated image is received from a really simple syndication (RSS) feed and wherein the standardized data attributes differ from the user-defined attributes;
   automatically, via a blog infolet operating on an M×M platform, formatting the non-syndicated image to yield a formatted non-syndicated image, wherein the formatting is performed such that attributes of the formatted non-syndicated image conform to the user-defined attributes;
   compiling, via a processor and without user instruction to compile, the formatted non-syndicated image into a non-syndicated compilation for publication on the blog; and
   automatically posting the non-syndicated compilation on the blog.

2. The method of claim 1, wherein the non-syndicated compilation has a format necessary for the publication on the blog.

3. The method of claim 1, wherein the non-syndicated compilation further comprises a plurality of non-syndicated images in addition to the non-syndicated image.

4. The method of claim 3, wherein the plurality of non-syndicated images are received from a source other than the blog.

5. The method of claim 3, wherein the plurality of non-syndicated images are received from the blog.

6. The method of claim 1, wherein the non-syndicated image is received from a smartphone.

7. The method of claim 1, wherein the attributes which are specific to the blog are manually defined.

8. A system comprising:
   a processor; and
   a computer-readable storage medium having instructions stored which, when executed by the processor, cause the processor to perform a method comprising:
   identifying user-defined attributes associated with a topic of a blog of a user;
   receiving a non-syndicated image having standardized data attributes, wherein the non-syndicated image is received from a really simple syndication (RSS) feed and wherein the standardized data attributes differ from the user-defined attributes;
   automatically, via a blog infolet operating on an M×M platform, formatting the non-syndicated image to yield a formatted non-syndicated image, wherein the formatting is performed such that attributes of the formatted non-syndicated image conform to the user-defined attributes;
   compiling, via a processor and without user instruction to compile, the formatted non-syndicated image into a non-syndicated compilation for publication on the blog; and
   automatically posting the non-syndicated compilation on the blog.

9. The system of claim 8, wherein the non-syndicated compilation has a format necessary for the publication on the blog.

10. The system of claim 8, wherein the non-syndicated compilation further comprises a plurality of non-syndicated images in addition to the non-syndicated image.

11. The system of claim 10, wherein the plurality of non-syndicated images are received from a source other than the blog.

12. The system of claim 10, wherein the plurality of non-syndicated images are received from the blog.

13. The system of claim 8, wherein the non-syndicated image is received from a smartphone.

14. The system of claim 8, wherein attributes specific to the blog are manually defined.

15. A computer-readable storage medium having instructions stored which, when executed by a computing device, cause the computing device to perform a method comprising:
   identifying user-defined attributes associated with a topic of a blog of a user;
   receiving a non-syndicated image having standardized data attributes, wherein the non-syndicated image is received from a really simple syndication (RSS) feed and wherein the standardized data attributes differ from the user-defined attributes;
   automatically, via a blog infolet operating on an M×M platform, formatting the non-syndicated image to yield a formatted non-syndicated image, wherein the formatting is performed such that attributes of the formatted non-syndicated image conform to the user-defined attributes;
   compiling, via a processor and without user instruction to compile, the formatted non-syndicated image into a non-syndicated compilation for publication on the blog;
   automatically posting the non-syndicated compilation on the blog.

16. The computer-readable storage medium of claim 15, wherein the non-syndicated compilation has a format necessary for the publication on the blog.

17. The computer-readable storage medium of claim 15, wherein the non-syndicated compilation further comprises a plurality of non-syndicated images in addition to the non-syndicated image.

18. The computer-readable storage medium of claim 17, wherein the plurality of non-syndicated images are received from a source other than the blog.

19. The computer-readable storage medium of claim 17, wherein the plurality of non-syndicated images are received from the blog.

20. The computer-readable storage medium of claim 15, wherein the non-syndicated image is received from a smartphone.

\* \* \* \* \*